(12) United States Patent
Akenine-Moller et al.

(10) Patent No.: US 10,319,074 B2
(45) Date of Patent: *Jun. 11, 2019

(54) APPARATUS AND METHOD FOR NON-UNIFORM FRAME BUFFER RASTERIZATION

(71) Applicant: Intel Corporation, Santa Clara, CA (US)

(72) Inventors: Tomas G. Akenine-Moller, Lund (SE); Robert M. Toth, Lund (SE); Bjorn Johnsson, Eslov (SE); Jon N. Hasselgren, Bunkeflostrand (SE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,083

(22) Filed: Jul. 10, 2017

(65) Prior Publication Data

US 2017/0372450 A1    Dec. 28, 2017

Related U.S. Application Data

(63) Continuation of application No. 14/691,504, filed on Apr. 20, 2015, now Pat. No. 9,704,217.

(51) Int. Cl.
| | |
|---|---|
| *G06T 3/40* | (2006.01) |
| *G06T 15/00* | (2011.01) |
| *G02B 27/01* | (2006.01) |
| *G06F 3/01* | (2006.01) |
| *G06T 1/20* | (2006.01) |

(52) U.S. Cl.
CPC ............ *G06T 3/403* (2013.01); *G02B 27/017* (2013.01); *G06F 3/011* (2013.01); *G06F 3/013* (2013.01); *G06T 1/20* (2013.01); *G06T 3/4092* (2013.01); *G06T 15/005* (2013.01); *G06T 2207/20024* (2013.01); *G06T 2207/20192* (2013.01)

(58) Field of Classification Search
CPC ....... G06T 11/40; G06T 15/005; G09G 5/391; G09G 2340/0407
See application file for complete search history.

(56) References Cited

U.S. PATENT DOCUMENTS

| | | |
|---|---|---|
| 5,239,625 A | 8/1993 | Bogart et al. |
| 5,872,572 A | 2/1999 | Rossignac |

(Continued)

FOREIGN PATENT DOCUMENTS

EP    1027682 B1    7/2003

OTHER PUBLICATIONS

International Search Report and Written Opinion for Application No. PCT/US2016/022793, dated Jul. 6, 2016, 12 pages.

(Continued)

*Primary Examiner* — Jeffery A Brier
(74) *Attorney, Agent, or Firm* — Nicholson De Vos Webster & Elliott LLP

(57) ABSTRACT

An apparatus and method are described for a non-uniform rasterizer. For example, one embodiment of an apparatus comprises: a graphics processor to process graphics data and render images using the graphics data; and a non-uniform rasterizer within the graphics processor to determine different resolutions to be used for different regions of an image, the non-uniform rasterizer to receive a plurality of polygons to be rasterized and to responsively rasterize the polygons in accordance with the different resolutions.

34 Claims, 22 Drawing Sheets

(56) References Cited

U.S. PATENT DOCUMENTS

| | | |
|---|---|---|
| 2001/0028352 A1 | 10/2001 | Naegle et al. |
| 2002/0033287 A1 | 3/2002 | Bombardier |
| 2012/0060132 A1 | 3/2012 | Deng et al. |
| 2012/0206447 A1 | 8/2012 | Hutchins |
| 2012/0206455 A1 | 8/2012 | Shreiner |
| 2014/0253555 A1 | 9/2014 | Lum et al. |

OTHER PUBLICATIONS

Non-Final Office Action from U.S Appl. No. 14/691,504, dated Aug. 26, 2016, 19 pages.
Notice of Allowance from U.S. Appl. No. 14/691,504, dated Feb. 6, 2017, 11 pages.
International Preliminary Report on Patentability for Application No. PCT/US2016/022793, dated Nov. 2, 2017, 9 pages.

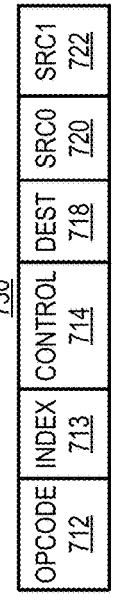
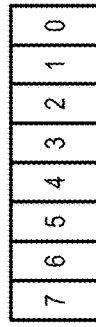
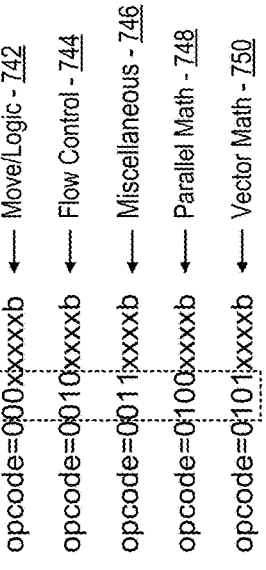
FIG. 7

FIG. 9A GRAPHICS PROCESSOR COMMAND FORMAT
900
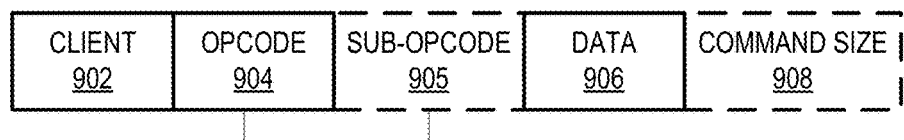
FIG. 9B GRAPHICS PROCESSOR COMMAND SEQUENCE
910
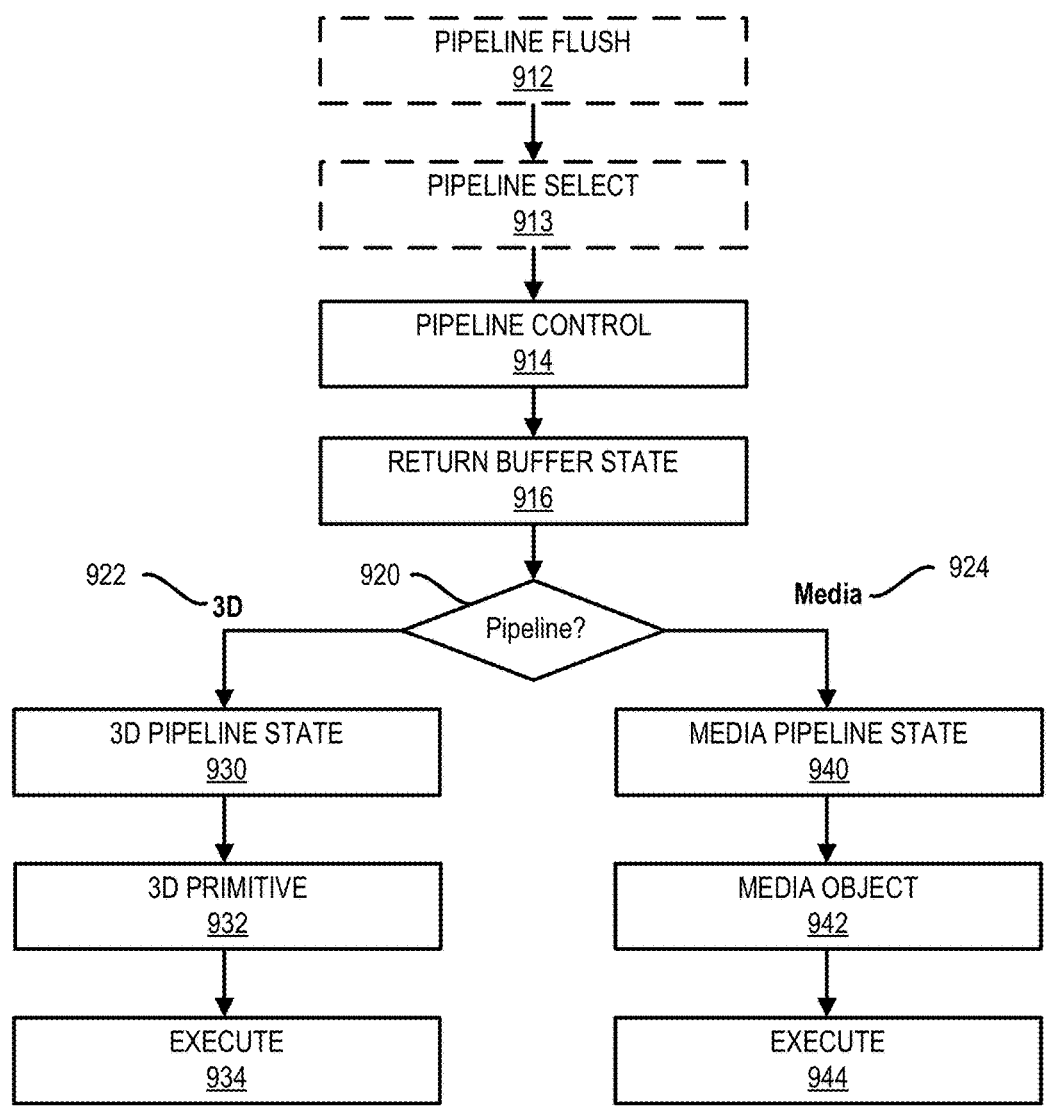

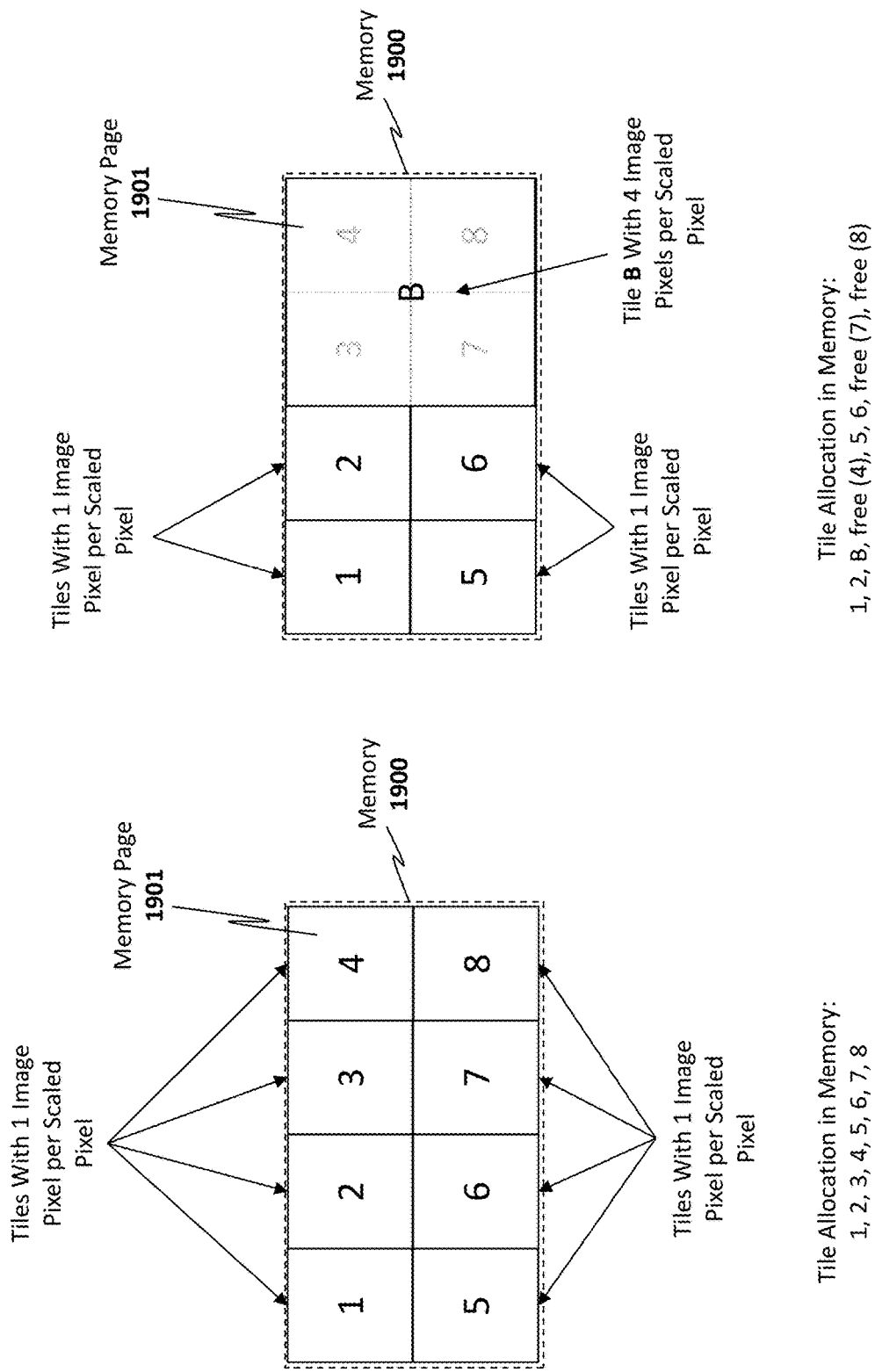

APPARATUS AND METHOD FOR NON-UNIFORM FRAME BUFFER RASTERIZATION

CROSS REFERENCE TO RELATED APPLICATION

This application is a continuation of copending U.S. patent application Ser. No. 14/591,504, filed on Apr. 20, 2015, all of which is hereby incorporated by reference.

BACKGROUND

Field of the Invention

This invention relates generally to the field of computer processors. More particularly, the invention relates to an apparatus and method for non-uniform frame buffer rasterization.

Description of the Related Art

Virtual reality (VR) is becoming an increasingly viable option for immersive applications, such as games and various industry applications. The reason for this is that companies, such as Oculus, Samsung, and Sony, have produced affordable head-mounted displays that are small and that have high image quality, low latency, and head tracking capabilities. It has been said that these head mounted displays will be the "last platform" in the sense that they will ultimately provide a fully immersive virtual reality experience which is indistinguishable from reality.

One problem, however, is that rendering needs to be done for both the left and right eyes of the user, which doubles the load on the graphics processor. In addition, the rectangular images are warped in order to compensate for the lenses inside the head-mounted display (HMD). This is illustrated in the example shown in FIG. 13.

Each warped image is typically generated from an intermediate image rendered using regular ("un-warped") planar projection techniques. In the image in FIG. 14 illustrates how the final warped image would look on such a planar image. In this illustration, only 10×10 out of every 15×15 pixels are shown in order to better visualize the warp function shape and to make the intermediate rendered image more visible. The pixels are sparse towards the edges of the images, implying that many more pixels will be rendered in this intermediate image than will be used to create the final image. Consequently, significant redundant work is performed. The useful pixel density at the upper and lower edges of the intermediate image is 1/18, at the right edge it is 1/20, and in the right corners the pixel density is only 1/38, i.e., one useful pixel per 38 rendered pixels.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

FIGS. 19A-C illustrate techniques for storing tiles of different resolutions into memory pages;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architecture and Data Types

System Overview

Figure 1:
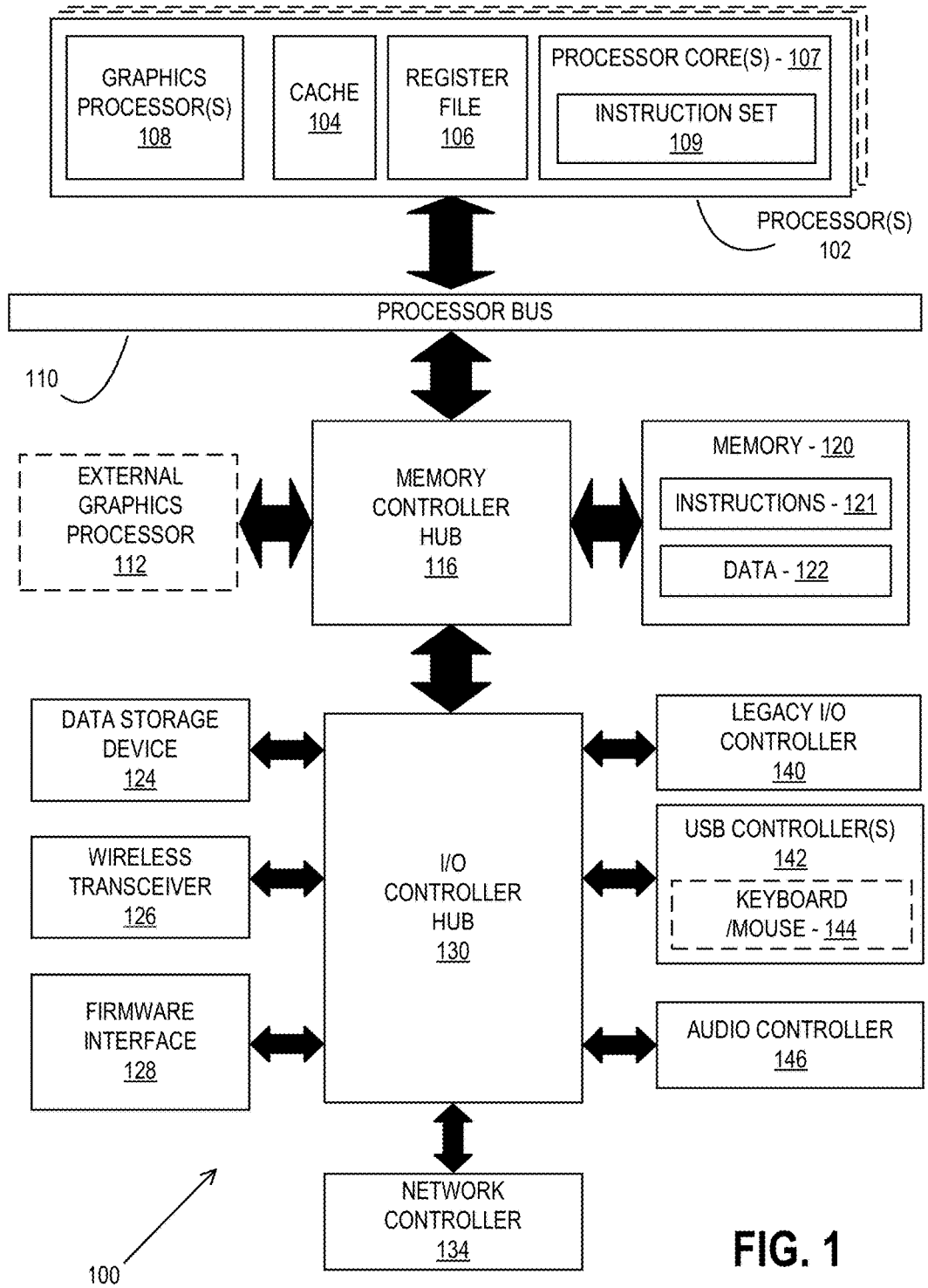
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
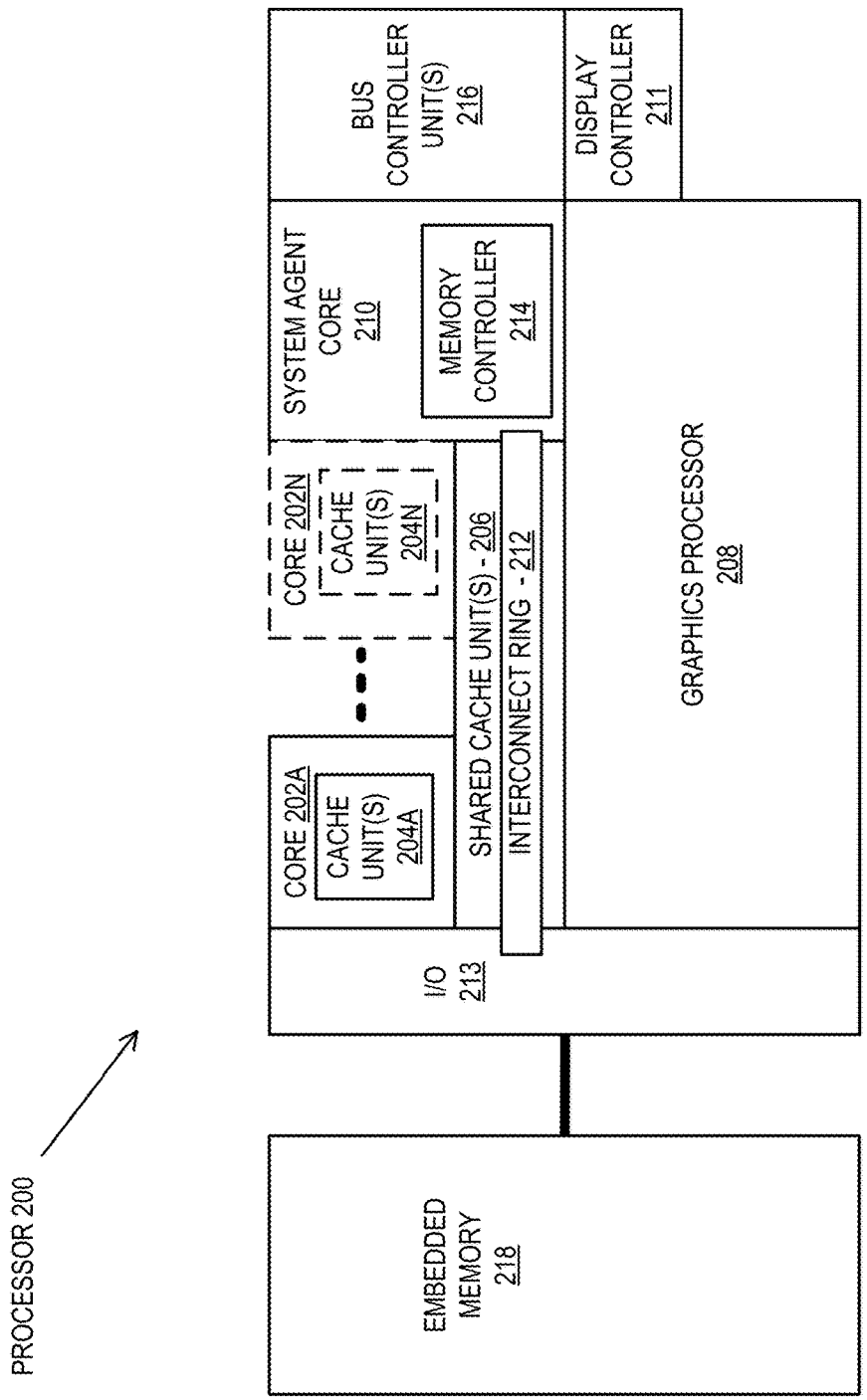
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
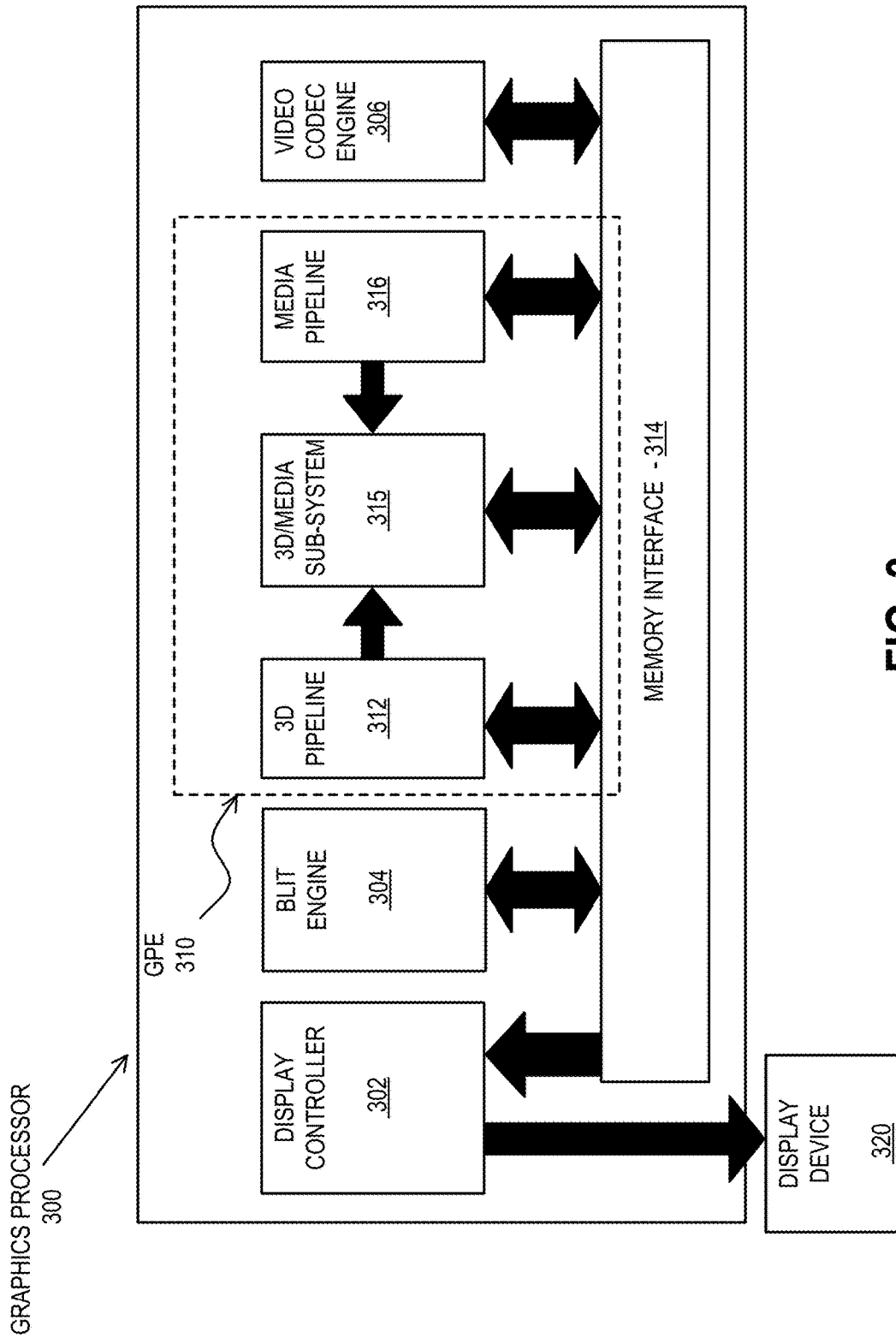
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
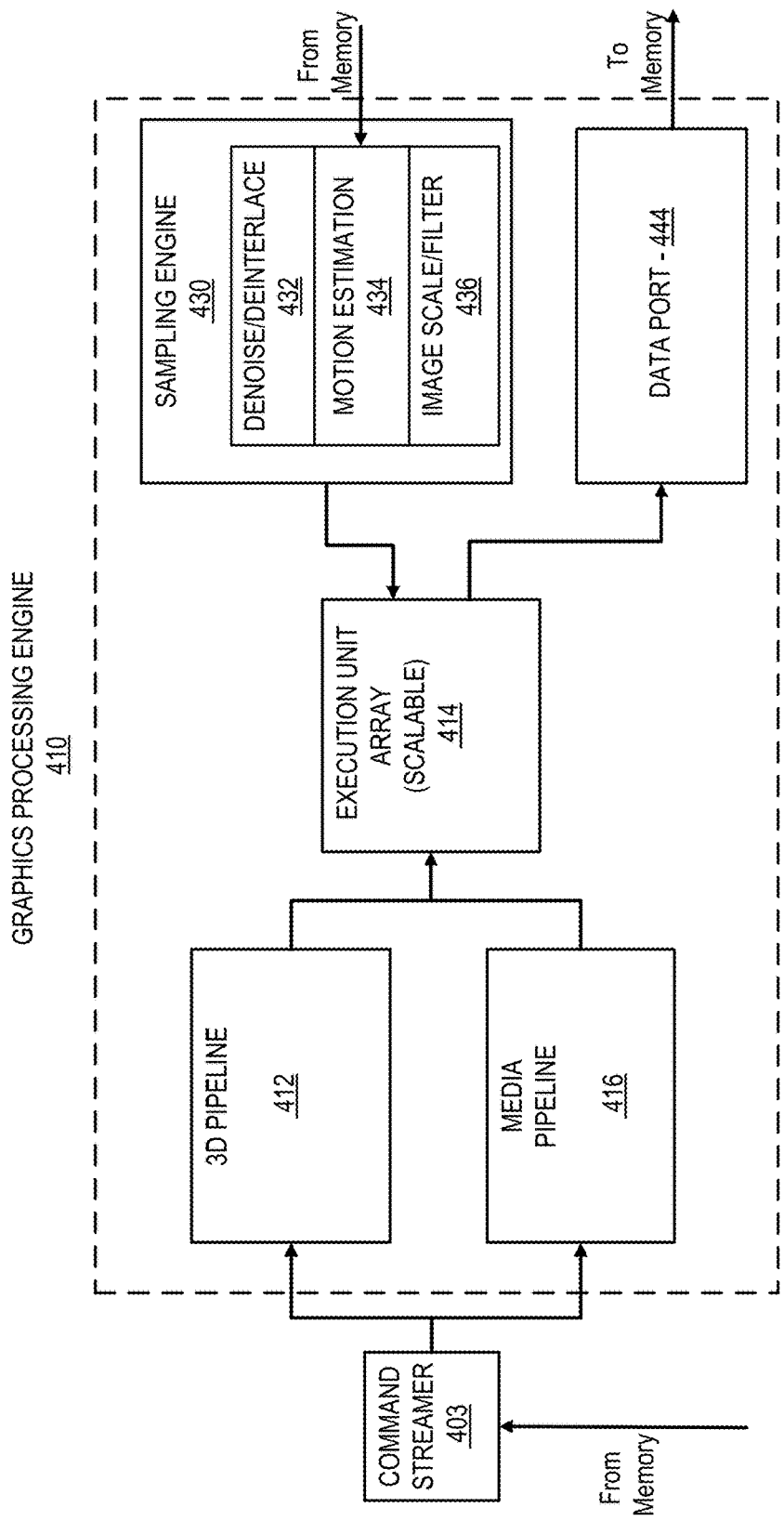
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
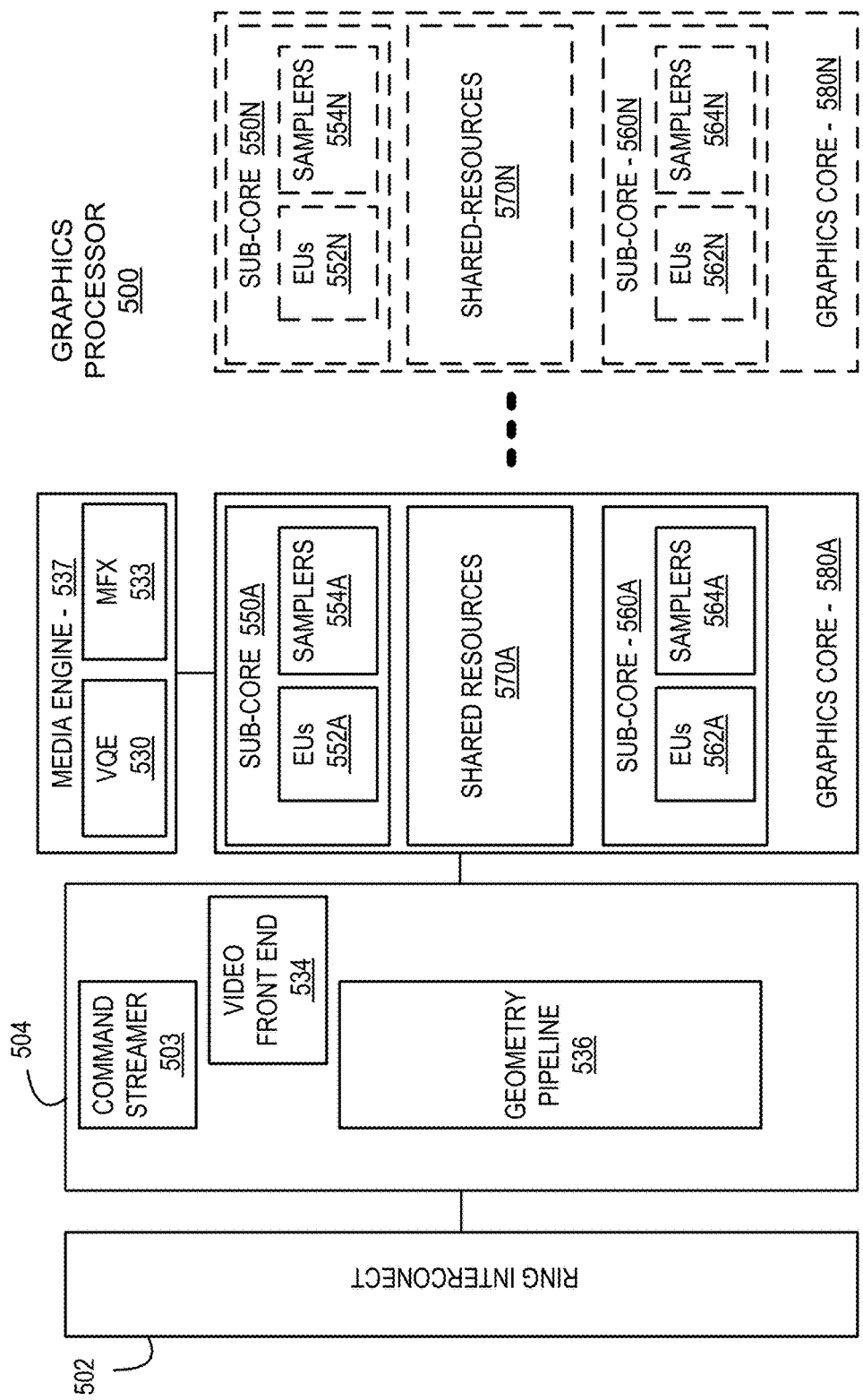
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
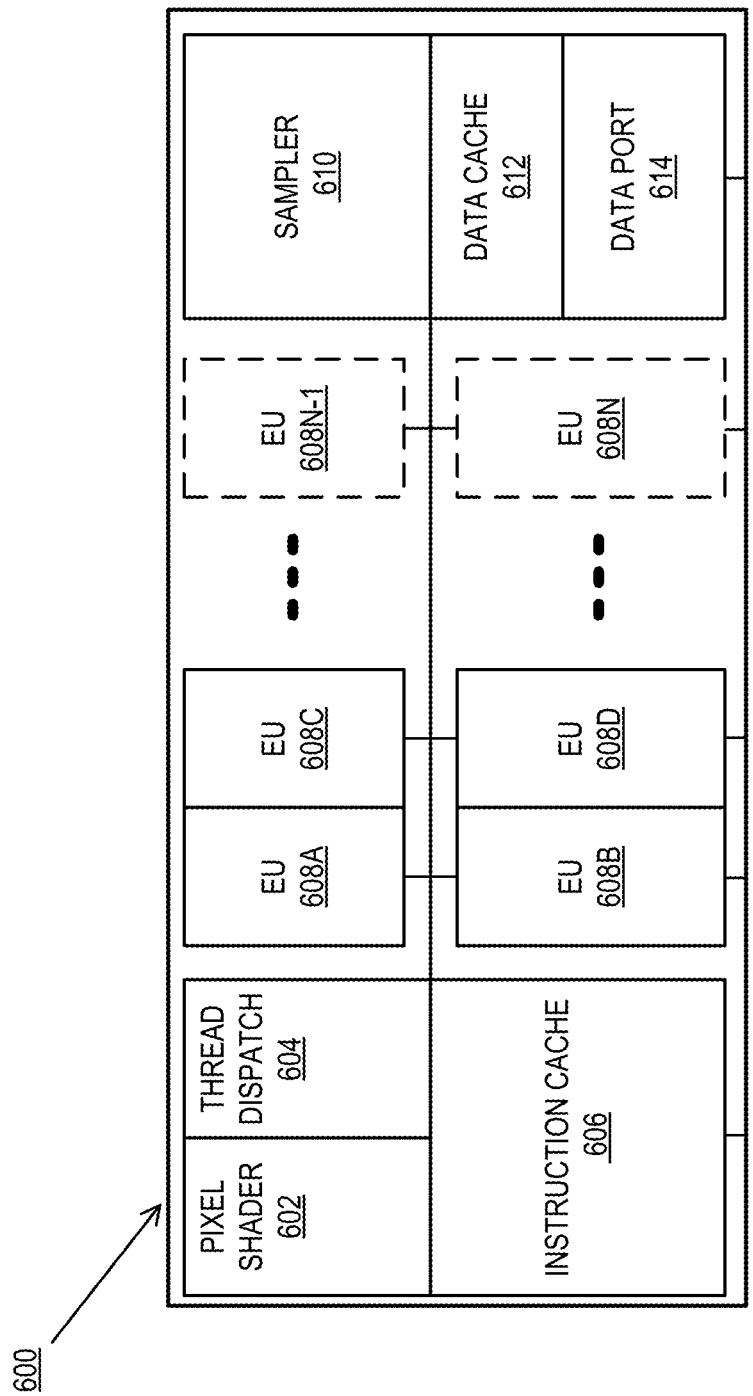
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data ort 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
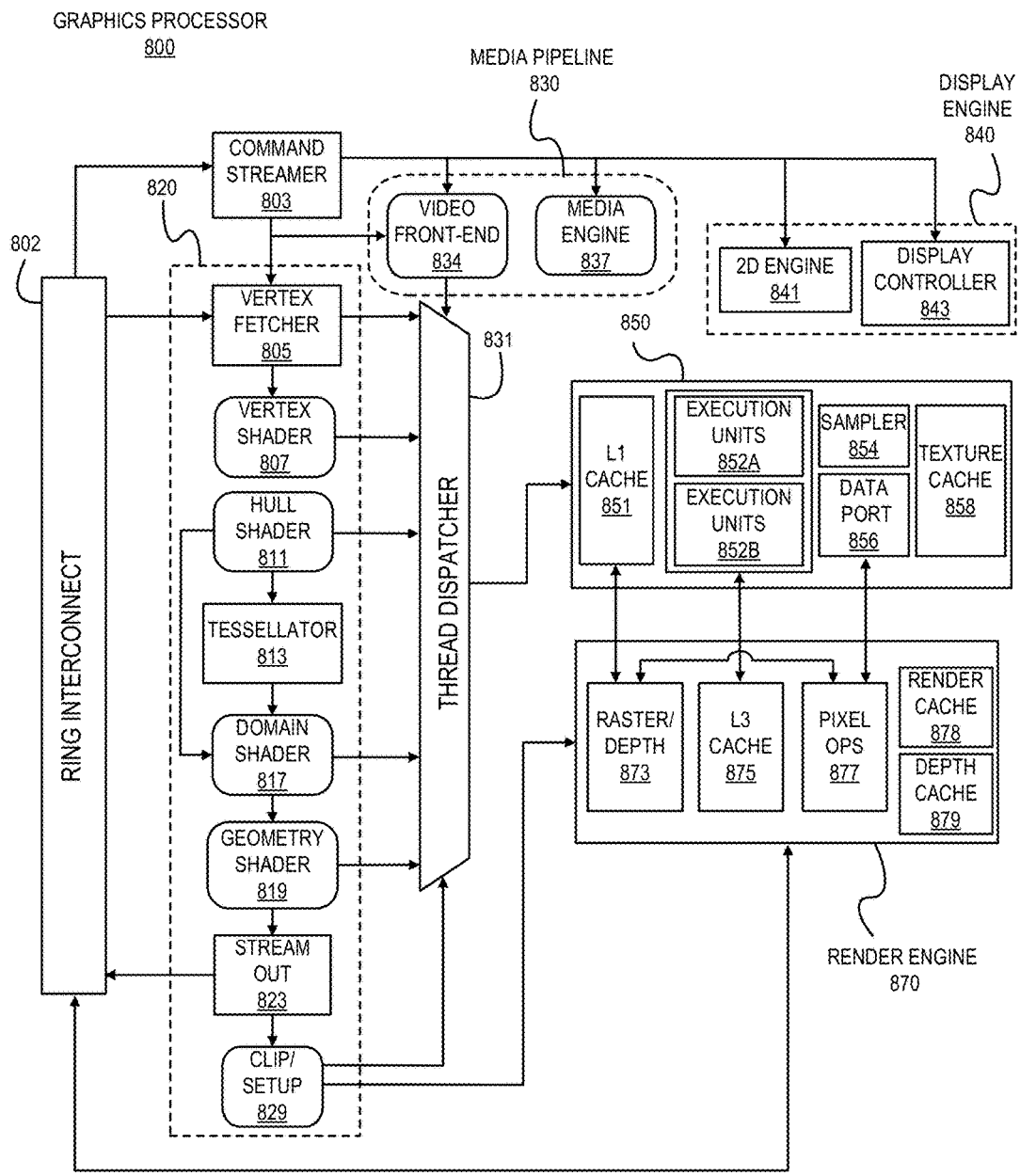
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
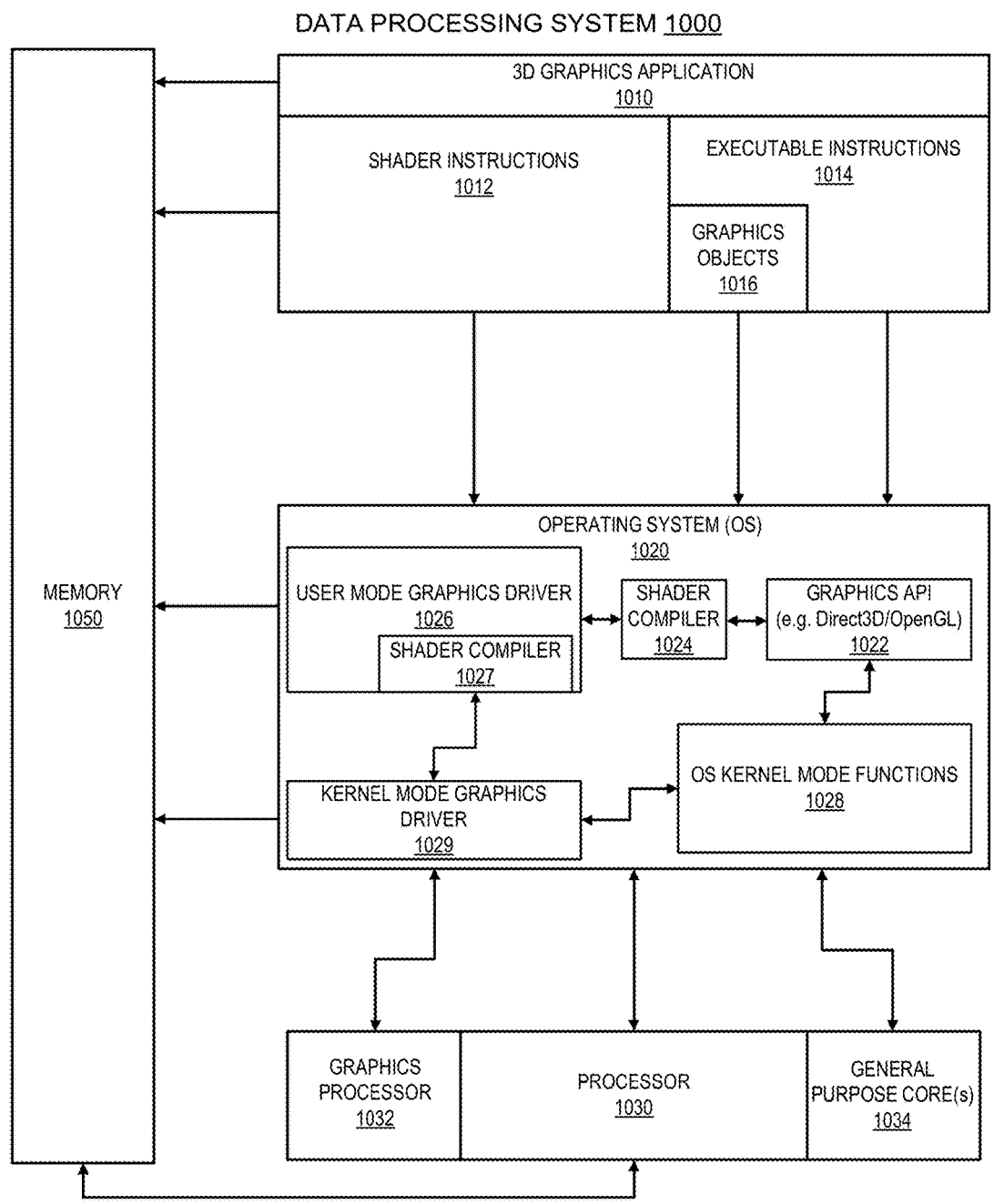
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
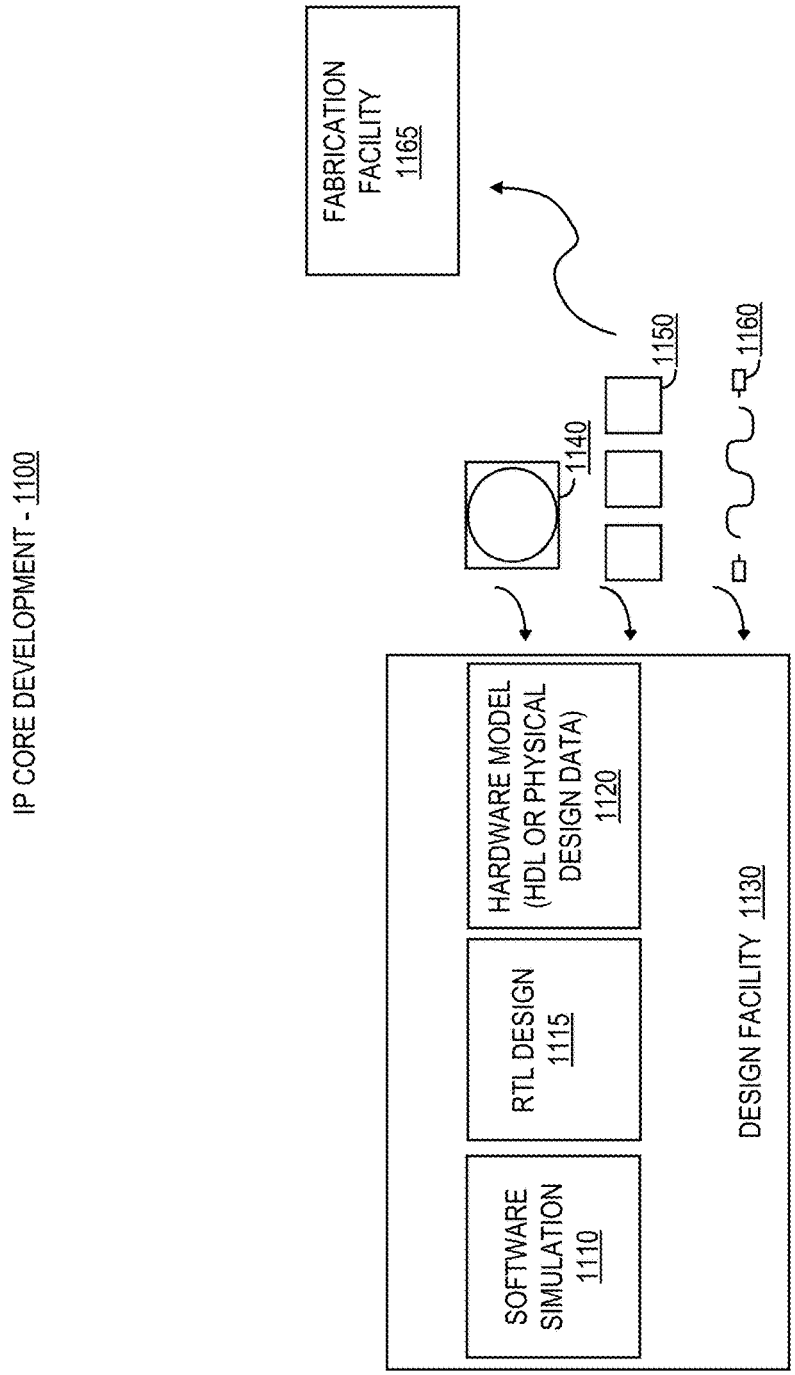
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
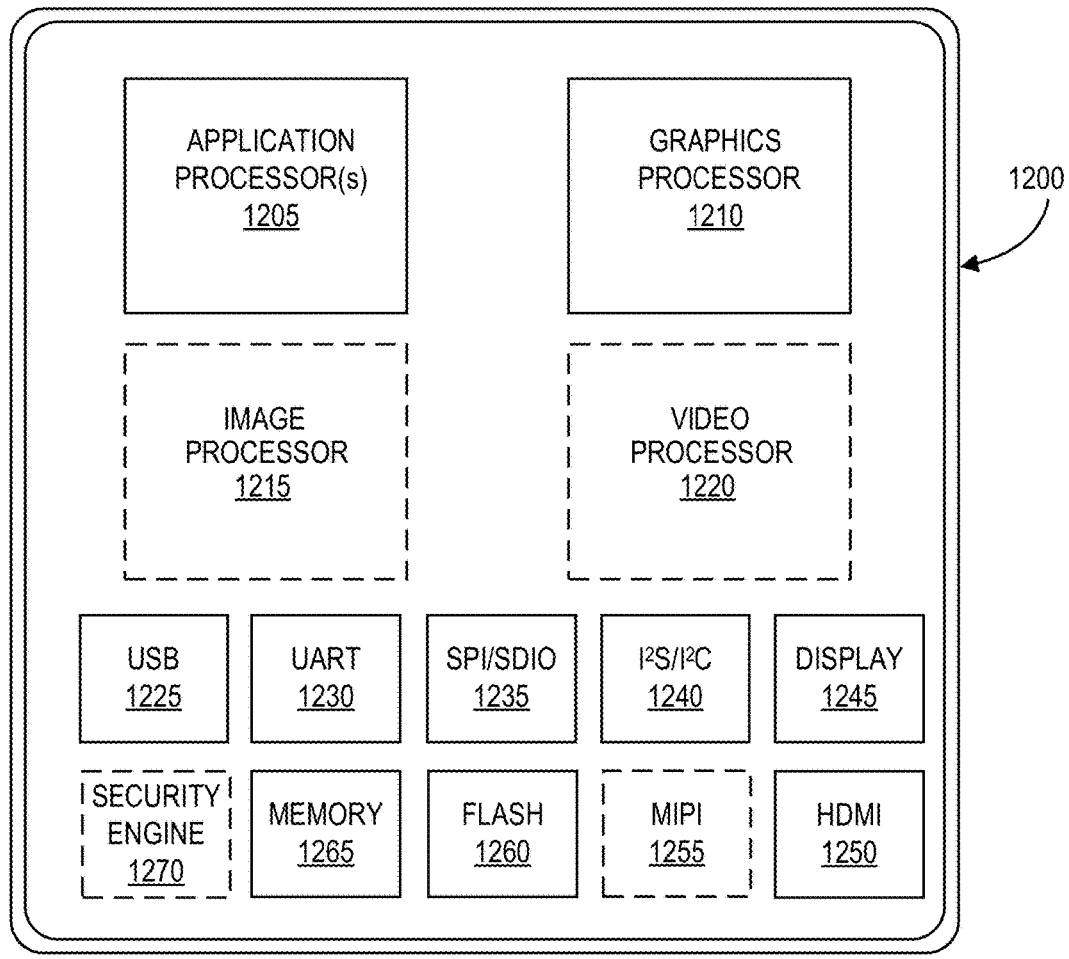
FIG. 12 illustrates an exemplary system on a chip integrated circuit that may be fabricated using one or more IP cores, according to an embodiment.
Figure 13:
FIG. 13 illustrates how rectangular images are warped in order to compensate for the lenses inside a head-mounted display (HMD)
Figure 14:
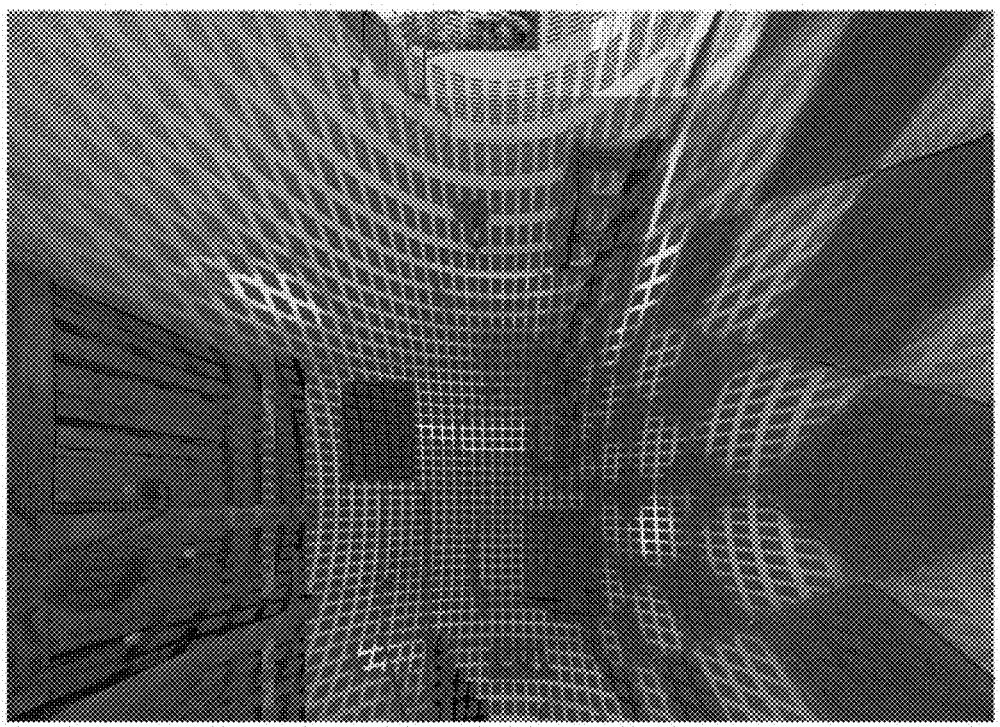
FIG. 14 illustrates how a final warped image appears when projected on a planar image.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Apparatus and Method for Non-Uniform Frame Buffer Rasterization

To provide for more efficient rasterization, one embodiment of the invention include hardware that efficiently reduces rendering resolution within designated regions of an image. In contrast to current graphics processing units (GPUs) in which all pixels in a rendered image have the same predefined pixel spacing across the image, the non-uniform frame buffer rasterizer described below allows the pixel spacing vary over the image in a way that makes rasterization highly efficient so that few modifications are needed in order to implement the desired result. By varying pixel spacing for rasterization, the number of shading executions and frame buffer accesses (depth and color) decreases substantially.

The underlying principles of the invention may implemented to improve rasterization efficiency for various different applications. As mentioned above, for example, in current virtual reality rendering systems, the pixels are sparse towards the edges of the images, requiring many more pixels to be rendered than will be used to create the final image. Thus, when used for virtual reality rendering the embodiments of the invention may be used to reduce rendering resolution towards the edges and corners of an intermediate image. It should be noted, however, that the underlying principles of the invention are not limited to virtual reality or any particular application.

As used herein, an "image pixel" (or just "pixel," for short) is a pixel of the rendered image. A "scaled pixel" (SP) is a rectangle enclosing one or more image pixels. A "scale factor" is the size ratio between a scaled pixel and an image pixel. A "tile" is a rectangular region containing a fixed number (W×H) of scaled pixels. The number of image pixels covered by a tile depends on the scale factor.

A tile may be a memory page or any other relevantly-sized buffer region. In current systems, there is a one-to-one correspondence between the scaled pixels and the pixels in the image. In contrast, in one embodiment of the invention, a tile may correspond to either W×H, 2 W×2 H, or 4 W×4 H image pixels, for example, corresponding to scale factors of 1×1, 2×2, or 4×4, respectively. As discussed below, a fixed-function rasterizer may be adapted to efficiently process such non-uniform frame buffers and the final buffer can be filtered efficiently with high quality. Using these techniques, it is possible to rasterize an image pixel density of 1/(4×4)=1/16 toward the edges, making such tiles ~16 times faster to render compared to directly rendering image pixels. A programmer may determine the scale factor over the image in one embodiment.

In the following discussion, certain assumptions will be made about tile size, scale factor, and other variables for the purposes of explanation. It should be clear, however, that the underlying principles of the invention may be implemented using other sizes, scale factors, etc. In the discussion below it is assumed that a tile has 4×4 scaled pixels (SPs), and that the possible scale factors are 1×1, 2×2, and 4×4, meaning that a tile may correspond to 4×4 image pixels, 8×8 image pixels, or 16×16 image pixels, respectively. In other embodiments, non-symmetric scale factors such as 2×4 and 4×1, etc, may also be used.

Figure 15:
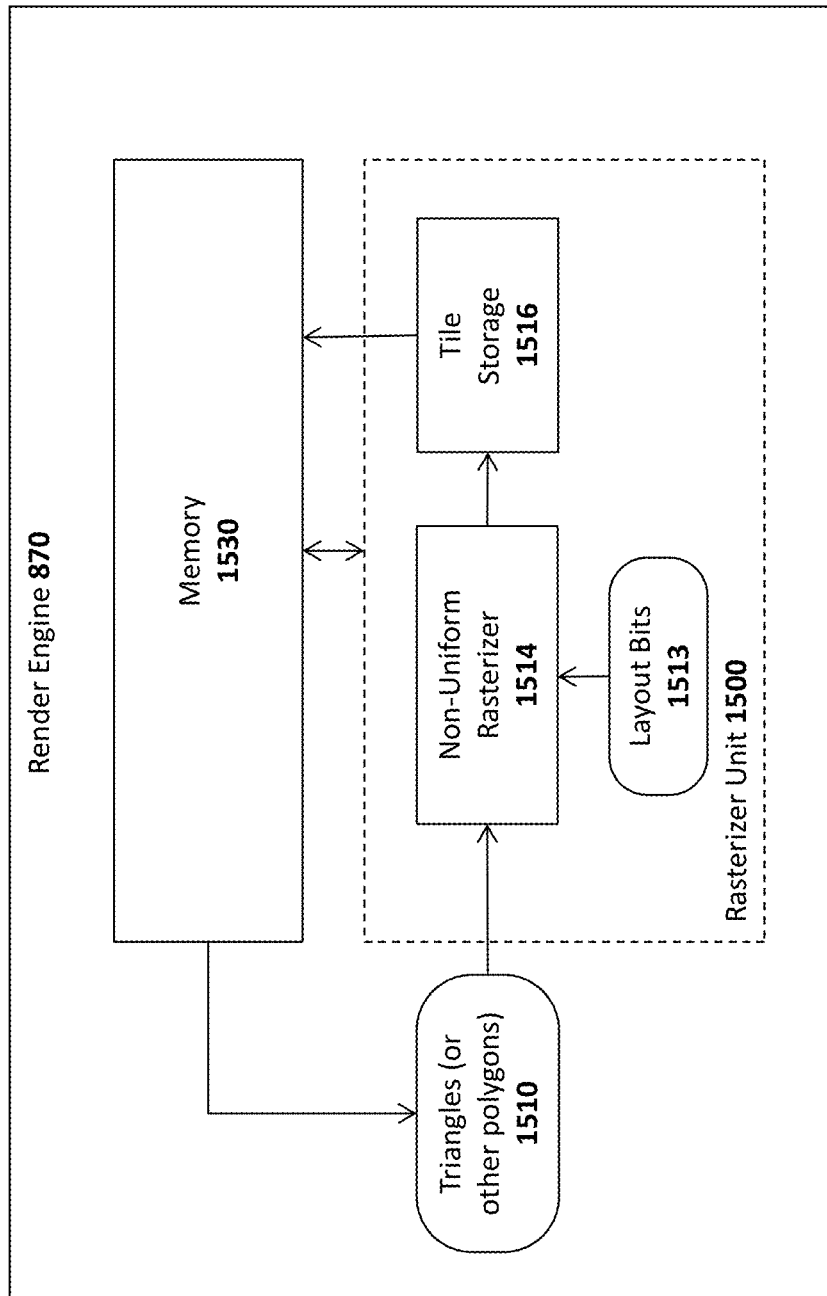
FIG. 15 illustrates a render engine in accordance with one embodiment of the invention.

FIG. 15 illustrates a render engine 870 in accordance with one embodiment of the invention which includes a memory 1530 (e.g., a frame buffer or set of frame buffers) for storing graphics data and a rasterizer unit 1500 for performing non-uniform rasterization as described herein. The render engine 870 may be implemented within a graphics processor architecture such as those described above with respect to FIGS. 1-12. However, the underlying principles of the invention are not limited to any particular GPU architecture. A brief overview of the render engine 870 will first be provided followed by a detailed description of the operations at different stages of the render engine.

In one embodiment, triangles or other polygons 1510 defining a surface to be rendered are generated by the font end of the graphics processor and are input to the rasterizer unit 1500. Non-uniform rasterization logic 1514 first tests each scaled pixel to determine if the square, rectangle, or other shape defined by each tile overlaps with the triangle being rendered. If so, the non-uniform rasterization logic 1514 then continues with per sample testing for these tiles. For example, the non-uniform edge functions discussed below may be used.

In one embodiment, the non-uniform rasterizer 1514 rasterizes at different resolutions for different portions of an image (e.g., using different scale factors for different tiles and portions of tiles). The particular manner in which the non-uniform rasterization is performed, including the scale factor to be used to define different resolution patterns for the tiles, is specified by layout bits 1513 which may be pre-selected based on known characteristics of the application for which the images are generated. For example, as mentioned above, for a virtual reality application, tiles towards the periphery of each image may be rendered with relatively lower resolution than the tiles in the middle region. The layout bits 1513 for each image frame may also be dynamically generated based on feedback information provided to the rasterizer unit 1500, such as in response to tracking a user's gaze as discussed below.

In one embodiment, tile storage logic 1516 then stores the results of the non-uniform rasterization in an efficient manner within the memory 1530. As discussed below, for example, the tile storage logic 1516 may store the image sparsely in memory using a mip map hierarchy or an "in-place" storage scheme.

To further illustrate the operation of different embodiments of the invention, various specific details such as specific tile sizes and shapes, scaled pixel sizes and shapes, and memory storage arrangements will be provided. It should be noted, however, that the underlying principles of the invention are not limited to these specific implementation details.

Figure 16B:
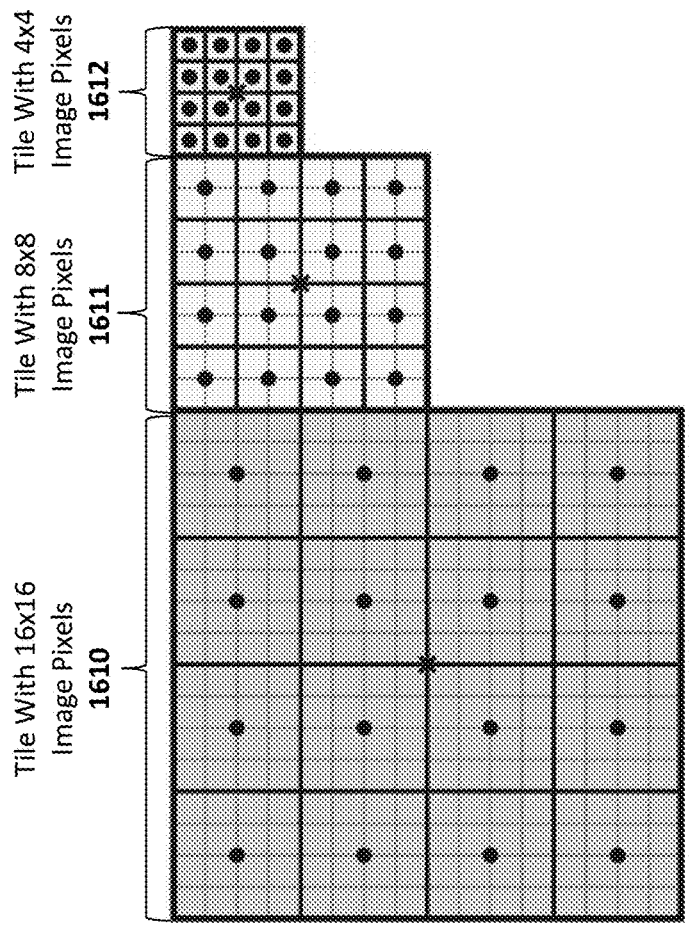
FIG. 16A-B illustrate exemplary tiles and sets of tiles employed in one embodiment of the invention.
Figure 16A:
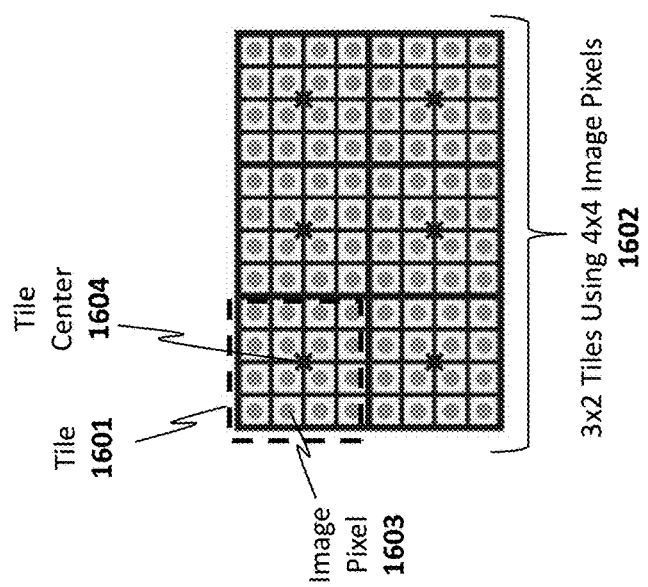

In FIG. 16A, an exemplary set of 3×2 tiles 1602 are illustrated. Each tile, such as tile 1601 (highlighted with a dotted square), includes 4×4 image pixels 1603 and a tile center 1604 (marked with an X). A typical hierarchical rasterizer may test to determine whether the square around 4×4 pixels overlaps with the triangle being rendered; if so, the rasterizer continues with per sample testing. To make this process more efficient, the value of the edge function, e(x,y) may be computed at the center 1604 of the 4×4 tile 1601. This value is then used in two different ways. First, when the rasterizer has determined that a triangle overlaps a tile, the edge function value at the center of the 4×4 tile is simply offset to compute the edge function values for the samples. For example, the edge function may be implemented as:

$$e(x,y)=a*x+b*y+c,$$

where a, b, and c are constants that are computed in the triangle setup from the vertices of the triangle. An edge function of a sample may be evaluated as:

$$e_c+a*x_p+b*y_p$$

In this example, $e_c$ is the edge function evaluated at the center of the tile, and $(x_p, y_p)$ are the local coordinates of a sample to be evaluated (i.e., "local" relative to the center of each tile). In the image shown in FIG. 16A, for example, the four samples closest to the tile center have the coordinates: (±0.5, ±0.5).

In one embodiment, the non-uniform rasterizer 1514 selects a different list of ($x_p$, $y_p$) coordinates for the scaled pixels for each possible scale factor used in a tile. For example, as illustrated in FIG. 16B, for a tile with 4×4 image pixels 1612 (i.e., a 1:1 ratio between scaled pixels and image pixels), the offset from the center to each of the first samples closest to the tile center is (±0.5, ±0.5). For a tile 1611 with 8×8 image pixels (i.e., 4×4 scaled pixels, each comprising 2×2 image pixels), the offset from the center to each of the first samples closest to the tile center is (±1.0, ±1.0). Finally, for a tile 1610 with 16×16 image pixels (i.e., 4×4 scaled pixels, each comprising 4×4 image pixels), the offset from the center to each of the first samples closes to the tile center is (±2.0, ±2.0). Thus, to ensure the proper offsets between pixels, the non-uniform rasterizer 1514 will choose these offsets based on the type of tile currently being rasterized. As mentioned, in one embodiment, this is accomplished by maintaining a different list of ($x_p$, $y_p$) coordinates for each of the different scale factors used to generate tiles.

In addition, in one embodiment, the non-uniform rasterizer 1514 factors in these scale factors when determining how to traverse from one tile center to the neighboring tile centers using only additions. For example, for tiles 1612 with 4×4 image pixels, to traverse to the tile immediately to the right of the current tile, the following computation can be performed: $e_c=e_c+a*4$, where a is used for traversing horizontally. The computation $e_c=e_c+b*4$ may be used for traversing vertically. In this example, the factor 4 results from the fact that tile widths/heights are 4 image pixels. For a tile 1611 with 8×8 image pixels, these equations become $e_c=e_c+a*8$ and $e_c=e_c+b*8$ (due to widths/heights of 8 image pixels) and for a tile 1610 with 16×16 image pixels, these equations become $e_c=e_c+a*16$ and $e_c=e_c+b*16$ (due to widths/heights of 16 image pixels).

In the examples shown in FIG. 16B, each tile comprises 4×4 scaled pixels but the size of the tile is dictated by the scaling factor used. For example, tile 1612 covers 4×4 image pixels, tile 1611 covers 8×8 image pixels, and tile 1610 covers 16×16 image pixels. It should be noted that the specific tile sizes and shapes illustrated in FIG. 16B have been selected merely for the purpose of explanation. The underlying principles of the invention are not limited to any particular tile size or configuration. In one embodiment, for example, a tile may be sized to fit within a memory page, which is usually 4096 bytes. If a pixel uses 4 bytes, then 1024 pixels may be stored in such a tile, which results in a tile size of 32×32 pixels.

Figure 17:
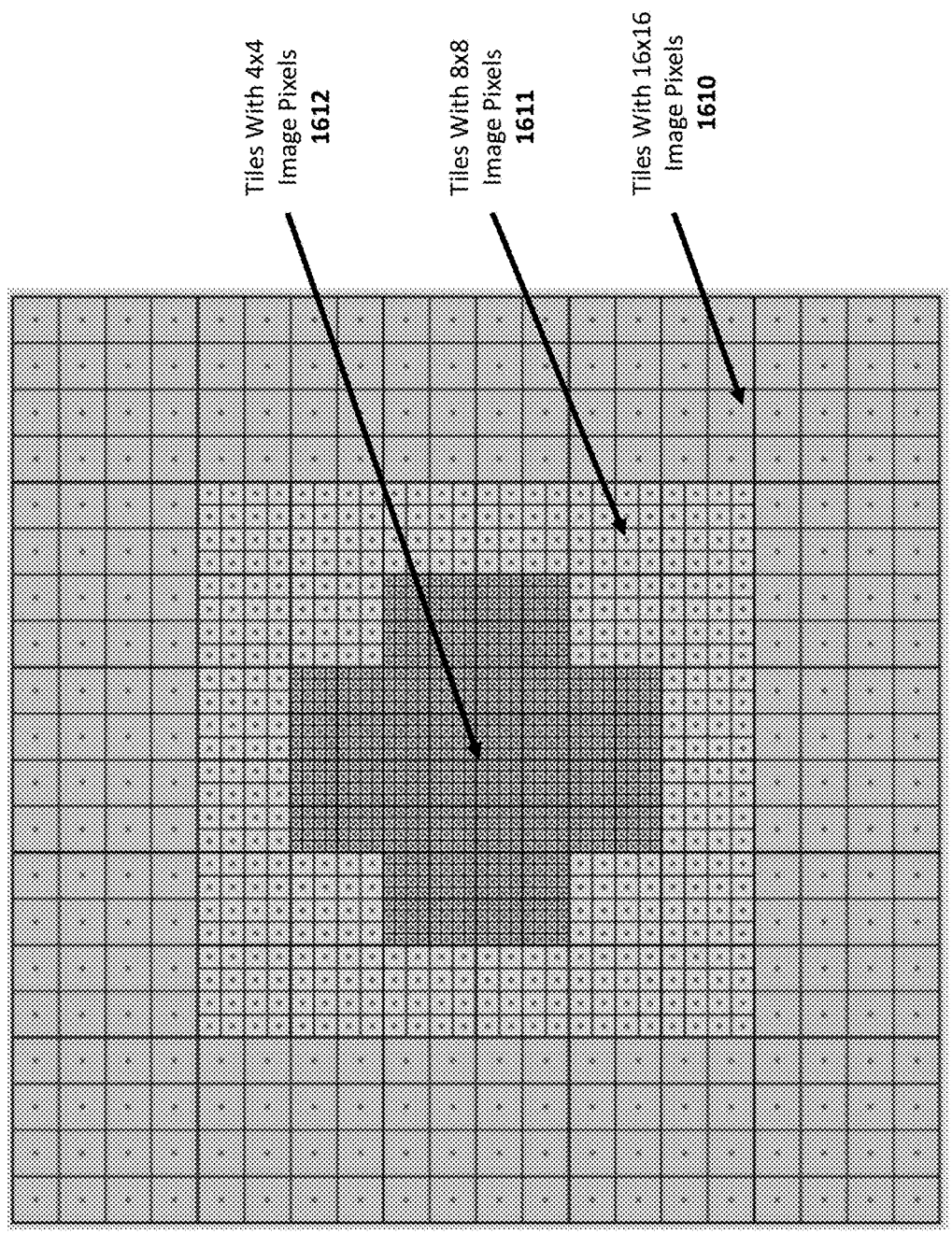
FIG. 17 illustrates an arrangement of tiles in which higher resolution tiles are positioned towards the center of the image.

FIG. 17 illustrates an exemplary arrangement which provides relatively higher resolution in the middle of the image and relatively lower resolution towards the edges of the image. As mentioned above, this arrangement may be used for a virtual reality implementation in which warping occurs towards the edges of the image. While all of the tiles 1610-1612 include 4×4 scaled pixels, different scaled pixels may be generated using different numbers of image pixels. The end result is that the lowest resolution tiles 1610 (towards the edges of the image) are generated with 16×16 image pixels, a relatively higher resolution set of tiles 1611 are generated with 8×8 image pixels, and the highest resolution tiles 1610 are generated with 4×4 image pixels (i.e., a one-to-one mapping).

One embodiment of the non-uniform rasterizer 1514 performs its operations from the perspective of the largest tiles (e.g., the tiles 1610 generated with 16×16 image pixels in FIG. 17), which are referred to herein as traverse tiles ("TTs"). In one embodiment, the rasterizer always keeps track of the edge function values at the center of TTs (e.g., 16×16 pixels) regardless of which scaling factor is used. Thus, traversing from the current TT to the TT to the right is done using $e_c=e_c+a*16$, since the TTs 1610 correspond to 16×16 image pixels.

Figure 18:
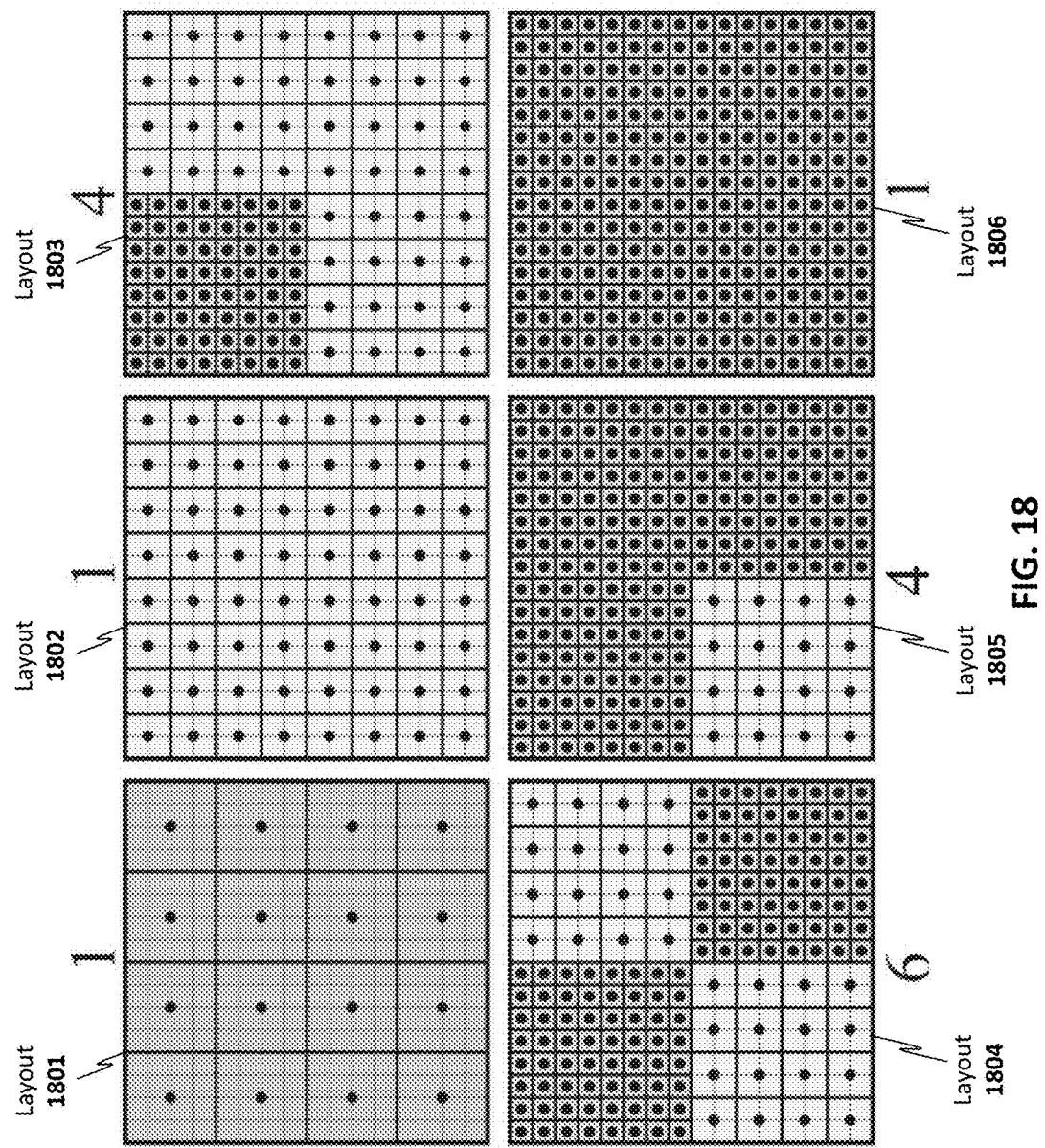
FIG. 18 illustrates a variety of different tile patterns employed in one embodiment of the invention.

In one embodiment, the layout used to generate each TT in an image may be selected by layout bits 1513 based on the particular application for which the non-uniform rasterization is performed (e.g., using higher resolution towards the center for certain virtual reality applications). By way of example, and not limitation, FIG. 18 illustrates a set of different layouts 1801-1806 per TT. Layout 1801 uses a single tile formed with 16×16 image pixels (e.g., such as tile 1610 in FIG. 16B), layout 1602 uses a set of four tiles formed with 8×8 image pixels (e.g., such as tile 1611 in FIG. 16B) and layout 1806 uses a set of sixteen tiles formed with 4×4 image pixels (e.g., such as tile 1612 in FIG. 16B). Layout 1803 includes a combination of four 4×4 pixel tiles and three 8×8 pixel tiles; layout 1804 includes a combination of eight 4×4 pixel tiles and two 8×8 pixel tiles; and layout 1805 includes a combination of twelve 4×4 pixel tiles and one 8×8 pixel tile.

The numbers above/below each region correspond to the number of permutations each such type of layout can have. For example, in layout 1803, the 8×8 image pixel tile region (top left) can be placed in each of the four corners resulting in four combinations for that layout. In this example, there are 1+1+4+6+4+1=17 different layouts per TT. In order to reduce the number of bits required to encode all of the permutations, some of the permutations may be skipped. For example, in layout 1804 two permutations may be skipped where the two 4×4 scaled pixel tile regions are located in opposite corners, and only the permutations where the two 4×4 scaled pixel tile regions are located either on the same horizontal or vertical position may be used (note that each 4×4 scaled pixel tile region has 2×2 tiles of 4×4 pixels each). This would mean that there are only 15 types of layouts per TT allowing an encoding using 4 bits to identify each type and permutation of TT (i.e., $2^4$=16). In one embodiment, the $16^{th}$ combination may be defined as unused. However, for more flexibility, one may choose to use 5 bits to store this encoding.

By way of example and not limitation, for a resolution of 1920×1200, there are 120×75 TTs, which means 120*75*4/8=4500 bytes of storage. With 32×32 scaled pixels per tile, it becomes 15*10*4/8=75 bytes of storage for a 1920×1200 resolution and 30*17*4/8=255 bytes for a 3840×2160 resolution.

In one embodiment, the non-uniform rasterizer 1514 reads the layout bits 1513 for each TT to determine the TT layout during rasterization of a triangle. Depending on the layout bits, the rasterizer 1514 then visits the 16×16 pixel, 8×8 pixel, and 4×4 pixel tiles by traversing to the center of these tiles (e.g., by computing a new $e_c$ value by adding tabulated values of ($p_x$, $p_y$) for the layout), and then testing if the triangle overlaps the corresponding tile; if so, sample testing continues.

For the example image shown in FIG. 17, during testing using the default settings for the Oculus Rift DK1 virtual reality headset, roughly 40% fewer fragments were rasterized using this technique without degrading image quality. This also eliminates the depth test and shading and their associated bandwidth usages as well as the color buffer physical memory and bandwidth usages, as described below.

Once scaled pixels are rendered, they need to be stored to memory. A simple solution would be to replicate the color and depth of a scaled pixel to all image pixels covered by the scaled pixel. However, this is highly undesirable since this would consume more physical memory and memory bandwidth than is necessary, as well as making depth optimizations difficult due to the nonlinear nature of the image pixels' depth.

Instead, one embodiment of the invention includes tile storage logic 1516 for efficiently storing tiles in memory 1530. Two storage schemes are described below, referred to as "in-place" storage and "mip" storage. Both of these storage schemes rely on allocating a large amount of virtual memory, but only the necessary amount of physical memory, leaving parts of the virtual memory unused.

On a modern computer, memory is allocated in pages, where a page is typically 4096 bytes. An image is stored in several pages, each page storing a rectangular piece of the image. In both the proposed storage schemes, the tile size is selected such that one tile takes up one page, e.g., 32×32 scaled pixels with 4 bytes per scaled pixel (that is, 4*32*32=4096), instead of the 4×4 scaled pixels in the examples above. If the color format is 8 bytes per scaled pixel, then a tile may be made to take up two pages instead (64×64 scaled pixels) in order to keep the tiles square, but this is only necessary for the mip storage scheme.

In one embodiment, the in-place storage scheme works as follows. The image memory is arranged as dictated by the finest resolution (i.e., a scale factor of 1×1 such as with the tile 1612 in FIG. 16B with 4×4 image pixels). When storing a tile of any scale, the upper left corner is used to determine where to store the tile. Thus, some pages will never be touched, nor be backed by any physical memory. In order to read this layout, the layout bits are used to determine the scale factor of the stored scaled pixels. If necessary, the layout bits can be deduced by inspecting which pages are backed by physical memory and which are not.

Figure 19C:
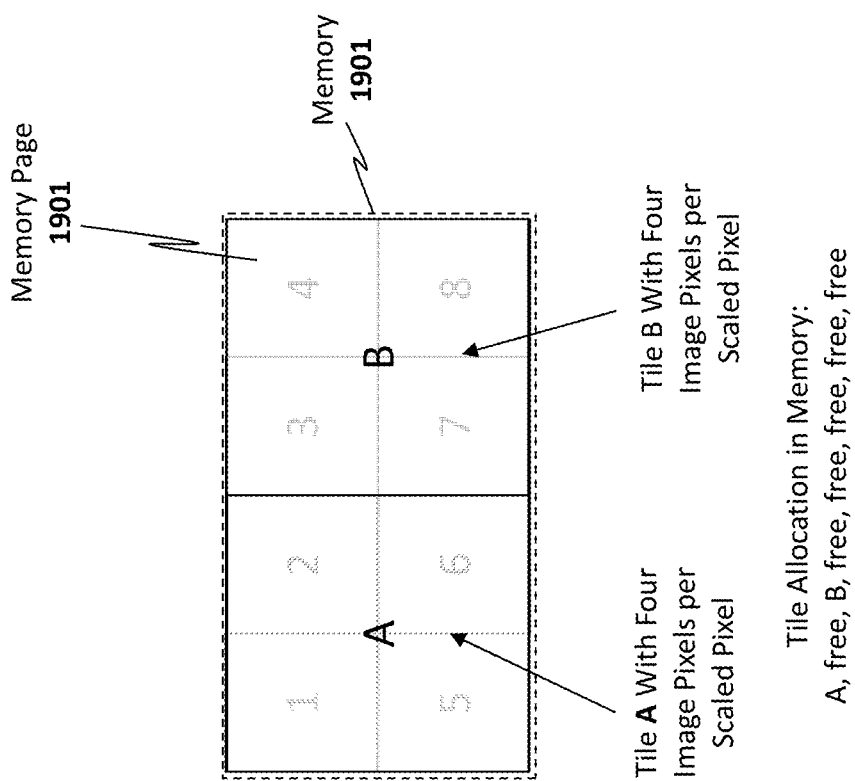

FIGS. 19A-C provide an example of how tiles with different numbers of image pixels (i.e., different ratios of image pixels to scaled pixels) may be packed within a set of memory pages 1-8. In FIG. 19A, tiles having the highest resolution, that is 1 scaled pixel=1 image pixel (e.g., tile 1612 in FIG. 16B), are packed into consecutive memory pages. Because each tile is sized to fit within a memory page, starting from the upper left corner of the image, a first tile is packed into page 1, a second tile is packed into page 2, etc. This is a typical way a texture would be stored in memory, with each tile being numbered from left to right, top to bottom, with each tile being stored consecutively.

FIG. 19B illustrates how non-uniform tiles may be packed within memory pages in accordance with one embodiment of the invention. The first two tiles have the highest resolution—1 image pixel per scaled pixel (i.e., the same resolution as all of the tiles in FIG. 19A)—and are stored within memory pages 1 and 2 as in FIG. 19A. However, after the first two tiles, the next tile (B) includes scaled pixels each including 4 image pixels (e.g., such as tile 1611 in FIG. 16B). Tile B is the same size as the high resolution tiles (because all tiles contain 4×4 scaled pixels) but it contains data for 8×8 image pixels. In one embodiment, tile B is stored at the location in memory where the third high resolution tile was stored in FIG. 16A—i.e., memory page 3. Where the other three high resolution tiles would have been stored, memory pages 4, 7, and 8, no physical memory is allocated to store the content of those locations.

FIG. 19C illustrates another example with two files A and B, both contain 8×8 image pixels (i.e., 2×2 image pixels per scaled pixel). In this example, tile A is stored in the same memory page (1) as the first high resolution tile in FIG. 19A and tile B is stored in the same memory page (3) as the third high resolution tile in FIG. 19A. Where the other six high resolution tiles would have been stored, memory pages 2, 4, and 5-8, no physical memory is allocated to store the content of those locations.

In one embodiment, the mip storage scheme works as follows. A mip map hierarchy is allocated in virtual memory. The finest level of the mip map represents the scale factor 1×1. When storing a tile of scaled pixels, the scale factor determines which mip level the tile is written to. This directly generates a sparsely populated mip-mapped image, where each region of the image is resident only in a single mip level. This representation may be readily accessed using the texture sampler of the graphics processor, which already supports mip map hierarchies.

Figure 20:
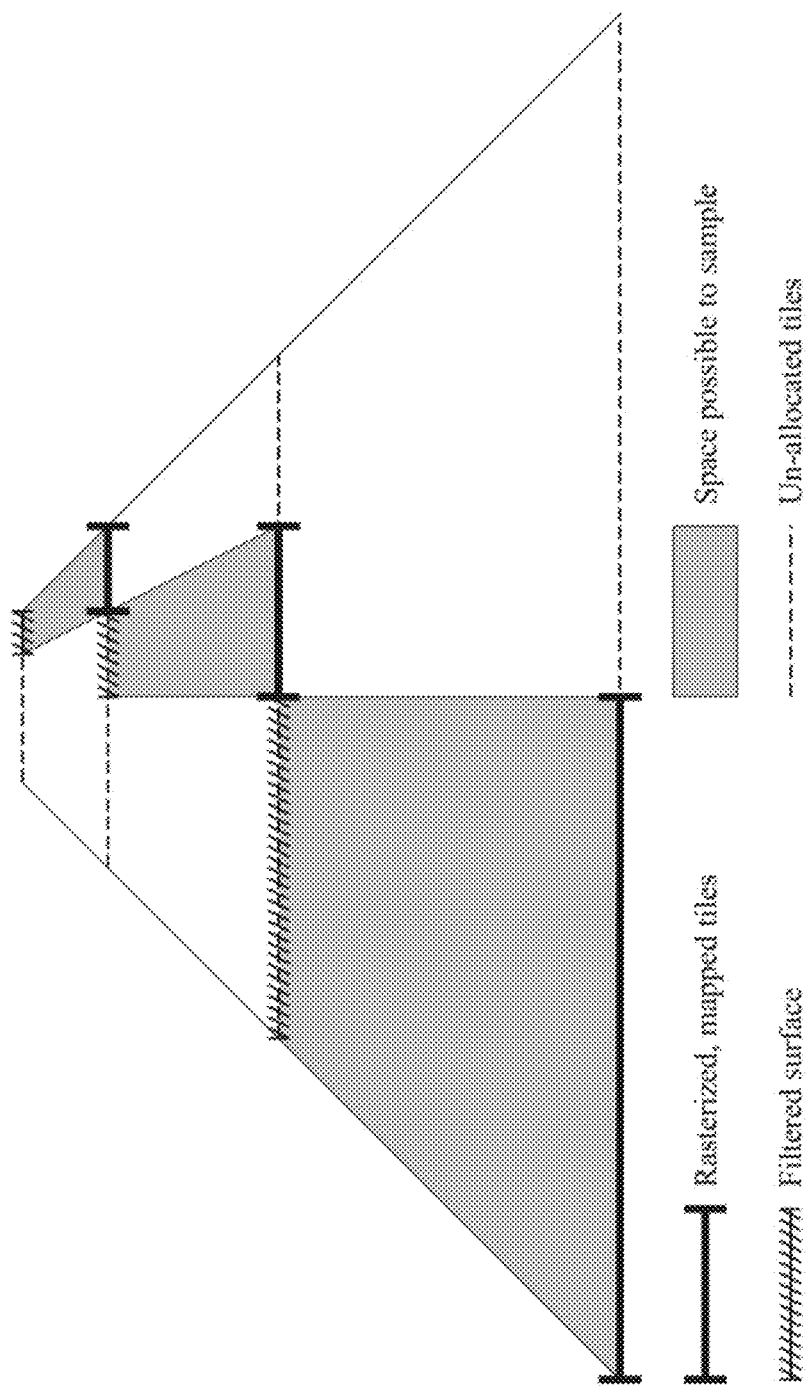
FIG. 20 illustrates three exemplary mip-map levels rasterized using non-uniform rasterization and tiles mapped using filtering.

To avoid sharp noticeable changes in resolution, the mip map hierarchy may allocate tiles for two or more mip map levels. In this embodiment, non-uniform rasterization is performed as described above, and executed until complete. The coarser level above each active tile may then be created by sampling existing tiles with a 2×2 texel box filter (or more sophisticated low-pass filter). The warping pass is changed so that texture coordinate derivatives are computed so that the filtered color is computed as a blend between the two populated mip levels for the current texture coordinate (e.g., a trilinear lookup). FIG. 20 shows an example of three mip-levels that have been rasterized to using non-uniform rasterization (such tiles are denoted rasterized, mapped tiles). As can be seen, the tile above each mapped tile is generated using filtering, referred to herein as the filtered surface. The gray area is where trilinear filtering may be used to sample during warping. Note that this example shows 1D textures (lines) for simplicity but may easily be extended to two-dimensional textures.

For borders between tiles where the rasterized resolution changes (e.g., from 2×2 to 4×4 scaling factor), sampling may be performed at the mip map layer that both tiles have populated. Alternatively, instead of computing texture coordinate derivatives, the mip map level of detail can be precomputed and stored in a separate texture, and simply looked up during warping. Yet another alternative is to skip the step where the coarser mip map level is created, and exploit that the coarse mipmap level is often created using a 2×2 box filter. Instead, during warping, there is only one level, and the coarser level texels can be computed by averaging finer level texels, and then blending.

In the very near future, all virtual reality devices will track where the user looks. This is sometimes referred to as "gaze tracking" where feedback from the virtual reality device, we can compute a new distribution of where to focus the rendering efforts. For example, using the techniques described above, the direction of the user's retina may be tracked and new layout bits may be dynamically computed for all tiles for both the left and right eye screens. In one embodiment, the tiles may be computed such that the region of each image where the user's retina is directed is provided with relatively higher resolution whereas the areas further away from where the user's retina is directed are provided with relatively lower resolution. The images may then be rendered for both the left and right eye using these new layout bits. The layout bits described above occupy only 255 bits per eye, and hence, there is not a lot of information to recompute per frame, and it is inexpensive to send to the GPU/graphics processor as well.

In summary, the embodiments of the invention described herein provide for rasterizing at different resolutions for different parts of an image to remove unnecessary information and improve efficiency. In one embodiment, the resolution is defined by the layout per tile of each image and potentially using a set of different resolution patterns within tiles. In addition, techniques are described for sparsely storing each image in memory including storing the image into a mip map hierarchy. For example, after non-uniform rasterization has completed, a mip level above populated tiles in mip map hierarchy may be created and then a trilinear lookup may be performed. Finally, the direction of the user's retina may be tracked and new layout bits may be dynamically computed for all tiles for both the left and right eye screens such that the region of each image where the user's retina is directed is provided with relatively higher resolution.

Figure 21:
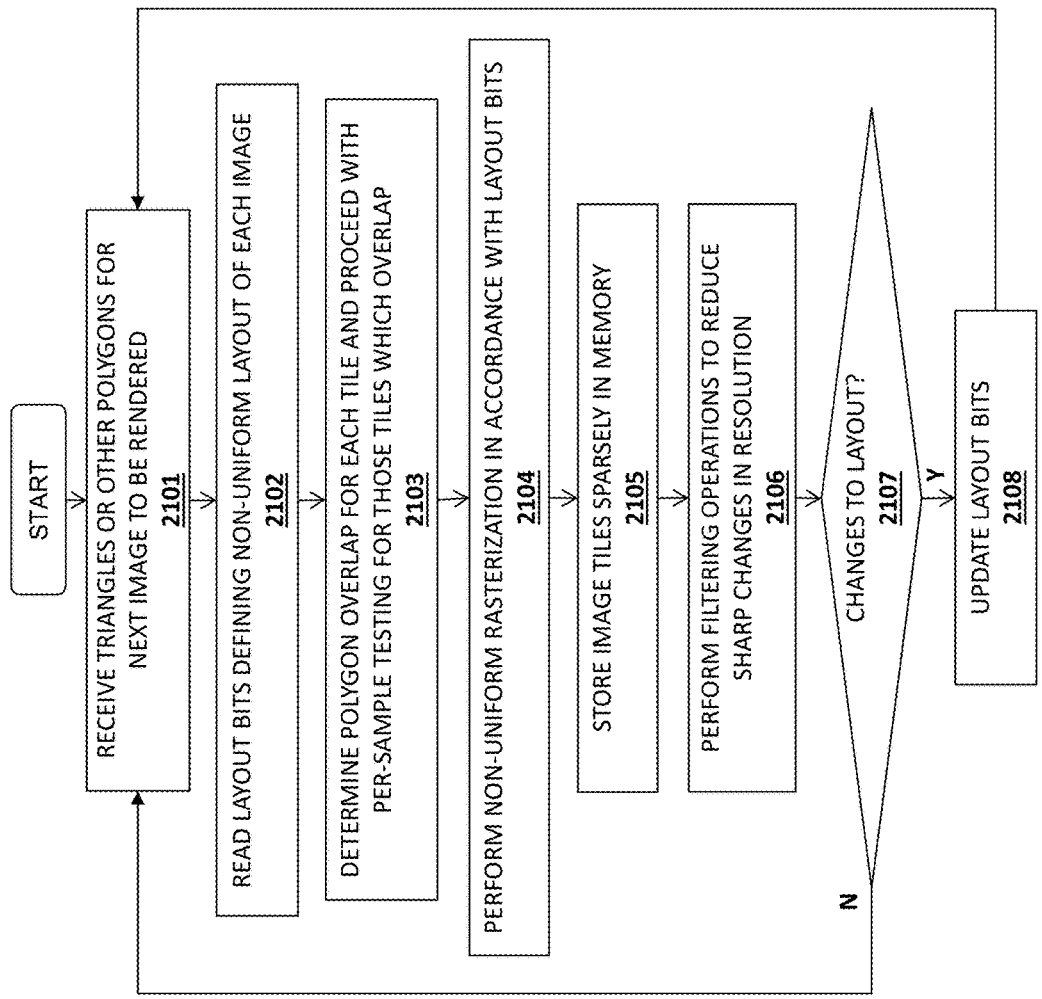
FIG. 21 illustrates a method in accordance with one embodiment of the invention.

A method in accordance with one embodiment of the invention is illustrated in FIG. 21. The method may be implemented within the context of the system architecture described above, but is not limited to any particular system architecture.

At 2101, triangles or other polygons are received for the next image to be rendered and, at 2102, the layout bits defining the non-uniform layout of each image are read. As discussed above, in one embodiment, different tile patterns may be defined within each image based on the layout bits (see, e.g., FIG. 18 and associated text).

At 2103, the overlap between tiles and polygons is determined. For example, each scaled pixel may be tested to determine if the square, rectangle, or other shape defined by each tile overlaps with the triangle being rendered. The techniques described above at this stage for evaluating edge functions and adjusting the $(x_p, y_p)$ coordinates and traversing between tile centers.

At 2104, non-uniform rasterization is performed in accordance with the layout bits. As mentioned, different layout bits may be defined to adjust the resolution in different regions of an image. For example, for a virtual reality implementation, relatively higher resolution may be provided in the middle of the image and relatively lower resolution may be provided towards the edges of the image (see, e.g., FIG. 17 and associated text). In an embodiment which tracks the user's gaze, the layout bits may be adjusted based on the current gaze of the user.

Once the non-uniform rasterization is complete, at 2105, the tiles of the rasterized image are store sparsely in memory. For example, an in-place storage scheme may be employed in which the memory is arranged as dictated by the highest resolution. Alternatively, a mip storage scheme may be employed in which a mip map hierarchy is allocated in virtual memory and different tiles are stored in different levels of the hierarchy.

At 2106, filtering operations are performed to reduce sharp edges between regions of the image rendered at different resolutions. Various different filtering techniques may be employed to reduce these sharp edges such as by applying a low pass filter to higher resolution portions of the image or using trilinear filtering operations.

At 2107 a determination is made as to whether there are changes to the layout for rasterization of the next image. For example, as mentioned above, in one embodiment, feedback information may be provided comprising a new set of layout bits. By way of example and not limitation, the focus of the user's retinas may have changed in a gaze tracking embodiment, thereby necessitating a change in the regions of the image to be rendered with high resolution. Regardless of the specific implementation, if there are changes to the layout, then the layout bits are updated at 2108. In either case, the process repeats starting at 2101 for the next image in the sequence.

Rendering to different resolutions for different parts of the image can be done today by rendering the entire scene once for each different resolution. For each of the resolutions, only the regions to be rendered at that resolution are computed, and the remaining regions are masked away using a stencil buffer. At the end, these images can be composited together to produce a single image with varying resolution.

This way of accomplishing variable resolution has several drawbacks. One is that the scene is rendered several times (once per resolution), and therefore geometry processing like vertex shading and triangle setup becomes several times more expensive. Another drawback is that the rasterizer will rasterize the regions that are masked away, since the stencil test is performed later in the pipeline. This will create pipeline bubbles, since many consecutive pipelines can be spent rasterizing masked regions while the pixel processing pipeline sits idle waiting for pixels that are not masked away. Lastly, the stencil buffer itself also consumes a non-trivial amount of bandwidth, especially if coupled with a depth buffer. An alternative way of lowering resolution is rendering several images at different angles, like a panorama, thus avoiding the large spacing at the periphery altogether. This is a much more involved technique that interferes with many visual effects, and is much more difficult to use. The embodiments of the invention disclosed herein have none of these drawbacks.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
one or more processor cores to execute instructions and process data; and
at least one graphics processor coupled to the processor cores to process graphics data and render images using the graphics data, the graphics processor comprising:
a rasterization circuit within the graphics processor to determine different resolutions to be used for different regions of an image, the rasterization circuit to receive a plurality of polygons to be rasterized and to responsively rasterize the polygons in accordance with the different resolutions;
wherein to rasterize the different regions of the image using different resolutions, the rasterization circuit is to subdivide each image into a plurality of tiles, wherein different tiles are formed using different numbers of image pixels to implement the different resolutions;
wherein each tile includes a specified number of scaled pixels and wherein a resolution of a tile is defined by a number of image pixels used to form each of the scaled pixels; and
wherein the rasterization circuit is to determine the different resolutions for different regions by reading layout bits used to configure the rasterization circuit, the layout bits specifying how tiles with different resolutions are positioned within each image.

2. The system of claim 1 further comprising:
a system memory comprising a dynamic random access memory (DRAM), static random access memory (SRAM), and/or Flash memory to store the instructions, data and graphics data.

3. The system of claim 1 further comprising:
a network interface to couple the one or more cores and graphics processor to a network.

4. The system as in claim 1 wherein in a highest resolution tile, each scaled pixel is formed with one image pixel, and in one or more lower resolution tiles each scaled pixels is formed with multiple image pixels.

5. The system as in claim 4 wherein in a first lower resolution tile, each scaled pixel is formed with 2×2 image pixels, and in a second lower resolution tile, each scaled pixel is formed with 4×4 image pixels.

6. The system as in claim 1 wherein certain layouts specified by the layout bits have one or more tiles with the same resolution contained therein and wherein other layouts specified by the layout bits have tiles with heterogeneous resolutions contained therein.

7. The system as in claim 1 wherein the layout bits are configured to specify higher resolution tiles towards a center region of the image and lower resolution tiles towards edges of the image.

8. The system as in claim 1 wherein the rasterization circuit is configured to initially determine whether overlap exists between a polygon and a tile, wherein the rasterization circuit is configured to only rasterize the tile if there is overlap between the tile and a polygon.

9. The system as in claim 8 wherein the rasterization circuit is configured to implement an edge function to determine a center of a tile and to navigate to scaled pixels within the tile using local X and Y coordinates based on a determined scaling factor used for each scaled pixel of the tile.

10. The system as in claim 9 wherein the rasterization circuit evaluates the scaling factors when determining how to traverse from one tile center to neighboring tile centers using only additions.

11. The system as in claim 1 further comprising:
tile storage logic to store tiles for the image in a memory.

12. The system as in claim 11 wherein each tile is sized to fit within a single memory page and wherein tiles having a highest resolution are stored in contiguous memory pages while tiles having lower resolutions are stored sparsely, resulting in non-contiguous gaps between at least some memory pages.

13. The system as in claim 11 wherein the storage logic allocates a mip map hierarchy to virtual memory and stores each tile of the image to a level in the mip map hierarchy based on a scale factor used for the tile.

14. The system as in claim 13 wherein the storage logic is configured to create a second mip level above a first mip level of a populated tile in the mip map hierarchy, the system further comprising blending logic to perform a blending operation in a region between and/or overlapping the first mip level and the second mip level to smooth sharp edges between tiles in the different mip levels.

15. The system as in claim 14 wherein the second mip level is created using a low pass filter.

16. The system as in claim 14 wherein the blending operation is performed using a trilinear lookup.

17. The system as in claim 1 further comprising:
a gaze tracking device to track a region of the image currently being viewed by a user and to generate data specifying a current direction of the user's gaze; and
layout bit generation logic to dynamically update the layout bits specifying how the tiles with different resolutions are positioned within the image based on the data specifying the current direction of the user's gaze.

18. The system as in claim 17 wherein the layout bits specify a relatively higher resolution for tiles in the direction of the user's gaze than tiles in regions further away from the user's gaze.

19. The system as in claim 1 wherein the graphics processor further comprises:
a plurality of execution circuits to execute one or more shaders including at least one pixel shader.

20. The system as in claim 19 wherein the graphics processor further comprises:
a depth test circuit to convert vertex-based objects in the graphics data to pixel-based representations to be processed by the at least one pixel shader.

21. The system as in claim 1 further comprising:
a command streamer to store commands to be executed by the at least one graphics processor to process the graphics data and render the images using the graphics data.

22. A system comprising:
one or more processor cores to execute instructions and process data; and
at least one graphics processor coupled to the processor cores to process graphics data and render images using the graphics data, the graphics processor comprising:
a rasterization circuit within the graphics processor to determine different resolutions to be used for different regions of an image, the rasterization circuit to receive a plurality of polygons to be rasterized and to responsively rasterize circuit the polygons in accordance with the different resolutions;
wherein to rasterize the different regions of the image using different resolutions, the rasterization circuit is to subdivide each image into a plurality of tiles, wherein different tiles are formed using different numbers of image pixels to implement the different resolutions;
wherein the rasterization circuit is configured to initially determine whether overlap exists between a polygon and a tile, wherein the rasterization circuit is configured to only rasterize the tile if there is overlap between the tile and a polygon.

23. The system as in claim 22 wherein the rasterization circuit is configured to implement an edge function to determine a center of a tile and to navigate to scaled pixels within the tile using local X and Y coordinates based on a determined scaling factor used for each scaled pixel of the tile.

24. The system as in claim 23 wherein rasterization circuit evaluates the scaling factors when determining how to traverse from one tile center to neighboring tile centers using only additions.

25. The system as in claim 22 wherein each tile includes a specified number of scaled pixels and wherein a resolution of a tile is defined by a number of image pixels used to form each of the scaled pixels.

26. The system as in claim 25 wherein in a highest resolution tile, each scaled pixel is formed with one image pixel, and in one or more lower resolution tiles each scaled pixels is formed with multiple image pixels.

27. The system as in claim 26 wherein in a first lower resolution tile, each scaled pixel is formed with 2×2 image pixels, and in a second lower resolution tile, each scaled pixel is formed with 4×4 image pixels.

28. The system as in claim 24 wherein the rasterization circuit is to determine the different resolutions for different regions by reading layout bits used to configure the rasterization circuit, the layout bits specifying how tiles with different resolutions are positioned within each image.

29. The system as in claim 28 wherein certain layouts specified by the layout bits have one or more tiles with the same resolution contained therein and wherein other layouts specified by the layout bits have tiles with heterogeneous resolutions contained therein.

30. The system of claim 22 further comprising:
a system memory comprising a dynamic random access memory (DRAM), static random access memory (SRAM), and/or Flash memory to store the instructions, data and graphics data.

31. The system of claim 30 further comprising:
a network interface to couple the one or more cores and graphics processor to a network.

32. The system as in claim 22 wherein the graphics processor further comprises:
a plurality of execution circuits to execute one or more shaders including at least one pixel shader.

33. The system as in claim 32 wherein the graphics processor further comprises:
a depth test circuit to convert vertex-based objects in the graphics data to pixel-based representations to be processed by the at least one pixel shader.

34. The system as in claim 22 further comprising:
a command streamer to store commands to be executed by the at least one graphics processor to process the graphics data and render the images using the graphics data.

* * * * *